United States Patent [19]
Kumada et al.

[11] Patent Number: 4,864,400
[45] Date of Patent: Sep. 5, 1989

[54] TELEVISION SYNCHRONIZATION SYSTEM

[75] Inventors: Junji Kumada; Tetsuo Mitsuhashi; Fumio Okano; Jun'ichi Ishida; Takashi Oketani; Tatsuhiko Kondo, all of Tokyo, Japan

[73] Assignee: Nippon Hoso Kyoka, Tokyo, Japan

[21] Appl. No.: 66,482

[22] PCT Filed: Nov. 17, 1986

[86] PCT No.: PCT/JP86/00587
§ 371 Date: May 28, 1987
§ 102(e) Date: May 28, 1987

[87] PCT Pub. No.: WO87/03155
PCT Pub. Date: May 21, 1987

[30] Foreign Application Priority Data
Nov. 18, 1985 [JP] Japan ................ 60-256804

[51] Int. Cl.$^4$ .................. H04N 5/04; H04N 5/067
[52] U.S. Cl. ........................... 358/148; 358/150
[58] Field of Search ............ 358/148, 150, 152

[56] References Cited

U.S. PATENT DOCUMENTS
4,223,074 9/1980 Breithaupt .................. 358/150
4,316,219 2/1982 Smith et al. ................. 358/150

FOREIGN PATENT DOCUMENTS
1007940 5/1952 France.
0112770 6/1984 Japan .................... 358/150
887532 1/1962 United Kingdom.

*Primary Examiner*—Edward L. Coles, Sr.
*Assistant Examiner*—Michael D. Parker
*Attorney, Agent, or Firm*—Spencer & Frank

[57] ABSTRACT

A television synchronization system in which a bipolar signal having a waveform including a front porch (304), a negative polarity pulse, a positive polarity pulse and a back porch is used as a horizontal sync signal, and a composite signal having a waveform including the positive polarity pulse, the back porch, a negative polarity pulse with a wide pulse width, a front porch and a negative polarity pulse is used as a vertical sync signal. When separating and reproducing the sync signals from a television signal transmitted through a transmission line, deviation of the reference phase can be eliminated so that the accuracy of the reproduced phase is improved. Therefore, the television synchronization system is preferably used in a high definition television system.

14 Claims, 9 Drawing Sheets

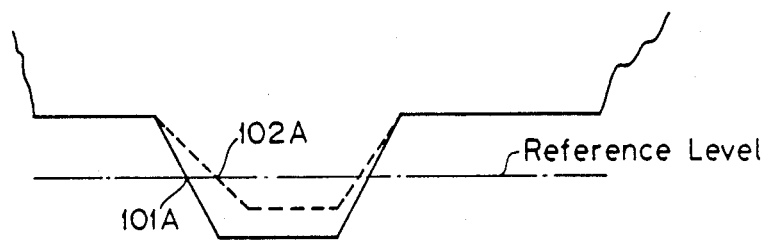
FIG. 1A
FIG. 1B
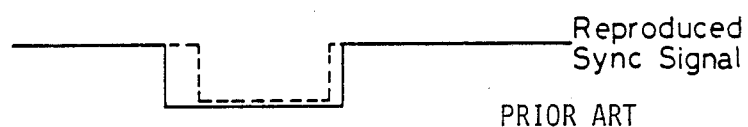
FIG. 2A
FIG. 2B
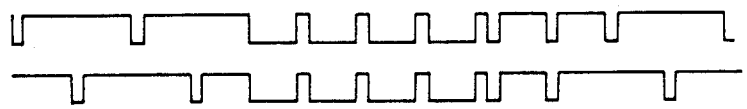
FIG. 2C
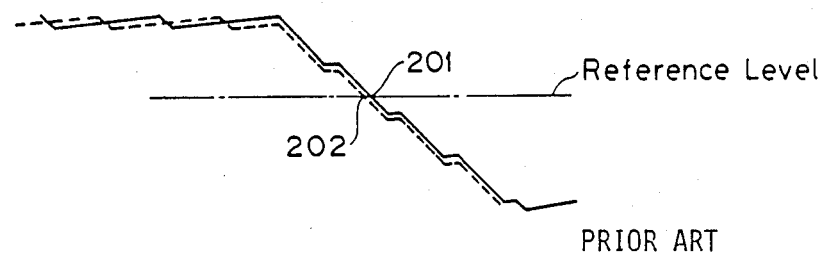

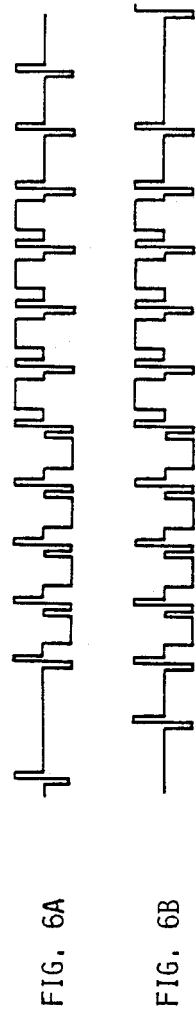
FIG. 6A
FIG. 6B
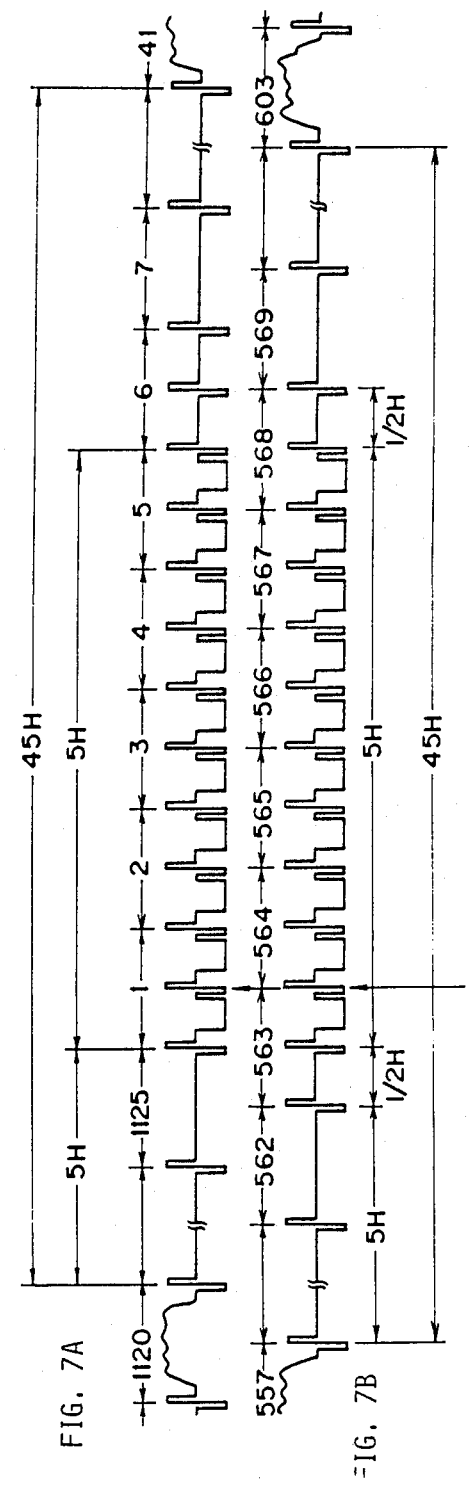
FIG. 7A
FIG. 7B

| Type | Scanning Line Number | Waveform Within 1H |
|---|---|---|
| (A) | 1~5<br>564~567 |  |
| (B) | 6 |  |
| (C) | 7~562<br>569~1125 |  |
| (D) | 563 |  |
| (E) | 568 |  |

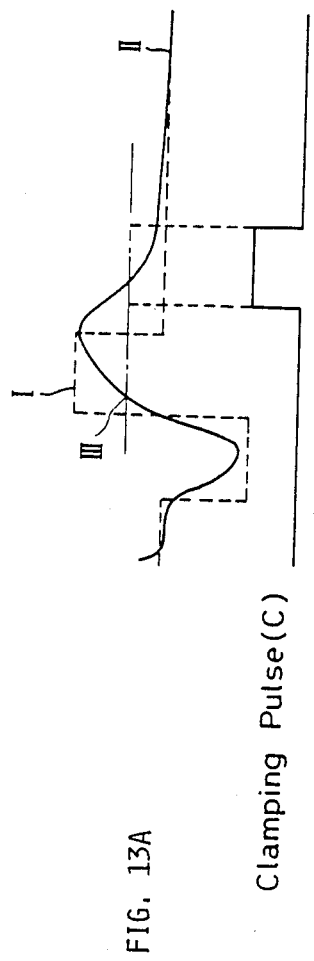
FIG. 13A  Clamping Pulse(C)
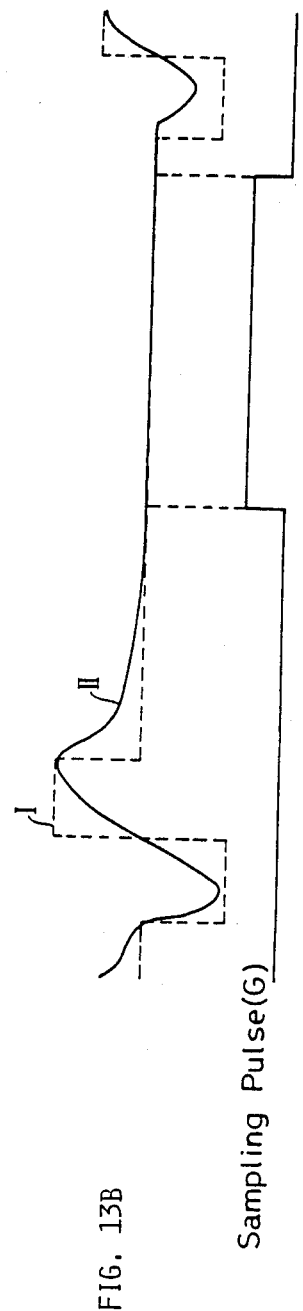
FIG. 13B  Sampling Pulse(G)

TELEVISION SYNCHRONIZATION SYSTEM

BACKGROUND OF THE INVENTION

1. Technical Field

The present invention relates to a television synchronization system and more particularly to a television synchronization system in which a sync signal has bipolar pulses, i.e., positive and negative polarity pulses which are symmetrical, so that a reproduced sync signal synchronously separated from a transmitted television signal has an improved accuracy of phase error.

2. Background Art

So far a television sync signal generally consists of negative polarity pulses only. As a result, the reference phase of a sync signal which is synchronously separated and reproduced from a transmitted television signal varies due to variations in the frequency and amplitude characteristics of a transmission line used to transmit the television signal.

FIGS. 1A and 1B show waveforms of a horizontal sync signal which is used in a conventional television system and is reproduced after transmission.

In FIG. 1A, the normal horizontal sync signal is indicated by the solid line and the intersection 101A of the horizontal sync signal with the reference level indicates the reference phase. The waveform shown by the broken-line is the horizontal sync signal distorted by the transmission line. The intersection 102A of the distorted horizontal sync signal with the reference level indicates a phase which is different from the reference phase.

In FIG. 1B, the horizontal sync signal which is reproduced from the above-described normal horizontal sync signal is indicated by the solid line, while the horizontal sync signal which is reproduced from the distorted horizontal sync signal is indicated by the broken-line. As shown in FIG. 1B, the reproduced phase is shifted due to the distortion and this shift varies depending on changes of the transmission line characteristics Next, the vertical sync signal will be explained.

FIGS. 2A, 2B and 2C are waveforms showing the vertical sync portion of the composite sync signal used in the conventional television system.

FIG. 2A is the waveform of the vertical sync portion of the composite sync signal in the first field, while FIG. 2B is the waveform of the vertical sync portion of the composite sync signal in the second field.

In order to accomplish the sync separation of the vertical sync signal from the composite sync signal which is transmitted through the transmission line, an integrator, for instance, can be used.

FIG. 2C shows an integrated waveform of a signal obtained by an integration circuit The solid line indicates the integrated waveform of the first field, while the broken-line indicates the integrated waveform of the second field. The vertical sync signal is reproduced in a different phase as indicated by the intersections 201 and 202 with the reference level in FIG. 2C.

In order to prevent such difference in phase, vertical equalizing pulses are added to the composite sync signal, but it has been impossible to completely eliminate the phase difference in the reproduced vertical sync signal in each field.

SUMMARY OF THE INVENTION

In view of the above, it is an object of the present invention to provide a television synchronization system which can eliminate the above-described disadvantages, even if the sync signals are separated and reproduced from the television signal transmitted through a transmission line which causes variations in frequency characteristics and amplitude, so that the sync signal is reproduced, while the reference phase is correctly maintained.

It is another object of the present invention to provide a television synchronization system in which a sync pulse waveform is so determined that the sync signal is reproduced, while the reference phase is correctly maintained.

To attain the above-described objects, a first aspect of a television synchronization system in accordance with the present invention is characterized by comprising: means for forming a horizontal sync signal having a period equal to one horizontal scanning period; means for forming a vertical sync signal having a period equal to one field period; means or forming a television sync signal from an arrangement of said horizontal and vertical sync signals; and means for setting a phase reference point of said horizontal sync signal at a point coinciding with a reference level.

Here, said means for forming the horizontal sync signal can form a horizontal sync signal in which amplitudes of waveforms in front of and in the rear of said phase reference point are equal in their absolute values and are opposite in their polarities.

Said horizontal sync signal forming means can form the horizontal sync signal whose waveforms in front of and in the rear of said phase reference point are symmetrical with respect to said phase reference point.

Said horizontal sync signal forming means can form the horizontal sync signal which includes a negative polarity pulse and a positive polarity pulse which are disposed closely and have the same pulse amplitude and the same pulse width.

Said horizontal sync signal forming means can form the horizontal sync signal in the form of a bipolar signal including a front porch, said negative polarity pulse, said positive polarity pulse and a back porch.

Said vertical sync signal generating means can form the vertical sync signal which includes a negative polarity pulse having a wide pulse width in the rear of said bipolar signal.

Said vertical sync signal generating means can form the vertical sync signal including said positive polarity pulse, said back porch, wide-pulse-width negative polarity pulse and said negative polarity pulse Said positive and negative polarity pulses can have a pulse amplitude of 300±6 mV and a pulse width of 0.59±0.03 μsec.

Said wide-pulse-width negative polarity pulse can have a pulse width of 11.86±0.05 μsec.

A second aspect of a television synchronization system in accordance with the present invention is characterized by comprising: means for forming a horizontal sync signal having a period equal to one horizontal scanning period; means for forming a vertical sync signal having a period equal to one field period; means for forming a television sync signal from an arrangement of said horizontal and vertical sync signals; means for forming said horizontal sync signal from a bipolar signal having a negative polarity pulse in front of a phase reference point and a positive polarity pulse following said phase reference point; and means for arranging a composite signal including a positive polarity pulse, a back porch, a negative polarity pulse having a wide pulse width, a front porch and a negative polarity pulse within one half of a horizontal scanning period following a negative polarity pulse to form said vertical sync signal from said composite signal.

Here, the television synchronization system in accordance with the present invention can be constructed by the provision of means for generating clock signals; first counting means for counting the clock signals from said clock signal generating means to generate a first count output every one horizontal scanning period; second counting means for counting the number of the horizontal scanning period corresponding to said first count output from said first counting means; storage means for storing horizontal sync signal information corresponding to a waveform of said horizontal sync signal in advance within one horizontal scanning period; output means for deriving from said storage means the horizontal sync signal information corresponding to the number of the horizontal scanning period obtained from said second counting means; and conversion means for accomplishing D/A conversion of an output from said output means to generate television horizontal and vertical sync signals.

Furthermore, the above-described television synchronization system can comprise: means for receiving a television signal; gate pulse generating means for detecting said negative polarity pulse from a sync signal included in the received television signal to generate a gate pulse for extracting a position of said phase reference point at which there is a conversion from said negative polarity pulse into said positive polarity pulse; clamping means for clamping said received television signal at a reference level of said sync signal; comparison means for comparing the reference level derived from said clamping means with the reference level of said sync signal; gate means for detecting said position of said phase reference point in response to said gate pulse derived from said gate pulse generating means and a comparison output from said comparison means; and means for reproducing the television sync signal in accordance with the detected position of said phase reference point.

Here, the reference level of said television sync signals can be set at a level determined by sampling the television signal derived from said clamping means by a sampling pulse produced in one horizontal scanning period within a vertical sync blanking period.

In a television synchronization method in which a television sync signal is formed by an arrangement of a horizontal sync signal having a period equal to one horizontal scanning period and a vertical sync signal having a period equal to one field period, a method for generating a television sync signal in accordance with the present invention is characterized in that a phase reference point in said horizontal sync signal is set at a point coinciding with a reference level.

Here, amplitudes of the waveforms of said horizontal sync signal in front of and in the rear of said phase reference point can be equal in their absolute values and can be opposite in their polarities.

The waveforms of said horizontal sync signal in front of and in the rear of said phase reference point can be symmetrical with respect to said phase reference point.

Said horizontal sync signal can include a negative polarity pulse and a positive polarity pulse which are disposed closely and have the same amplitude and the same pulse width.

Said horizontal sync signal can be in the form of a bipolar signal including a front porch, said negative polarity pulse, said positive polarity pulse and a back porch.

Said vertical sync signal can include a negative polarity pulse having a wide pulse width following said bipolar signal.

Said vertical sync signal can be in the form of a composite signal including said positive polarity pulse, said back porch, said negative pulse having a wide pulse width, said front porch and said negative polarity pulse.

Said positive and negative polarity pulses can have a pulse amplitude of 300±6 mV and a pulse width of 0.59±0.03 μsec.

Said wide-pulse-width negative polarity pulse can have a pulse width of 11.86±0.05 μsec.

BRIEF DESCRIPTION OF THE DRAWINGS

FIGS. 1A and 1B are waveforms showing a horizontal sync signal in a conventional television signal;

FIGS. 2A, 2B and 2C are waveforms showing a vertical sync signal in a conventional television signal;

FIGS. 6A and 6B are waveforms showing another arrangement of a sync signal in accordance with the present invention;

FIGS. 7A and 7B are waveforms showing a signal arrangement used in an embodiment of a television synchronization system in accordance with the present invention;

FIGS. 13A and 13B are waveforms showing operations of various portions of the synchronization separation circuit arrangement shown in FIG. 12.

DESCRIPTION OF THE PREFERRED EMBODIMENT

Now, the present invention will be described in more detail with reference to the accompanying drawings.

FIGS. 3A, 3B, 3C and 3D are waveforms showing a fundamental arrangement of a composite sync signal in accordance with the present invention.

Figure 3A:
FIGS. 3A, 3B, 3C and 3D are waveforms showing a fundamental arrangement of a sync signal in accordance with the present invention.
Figure 3B:
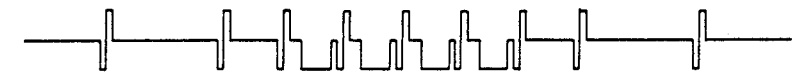
Figure 3C:
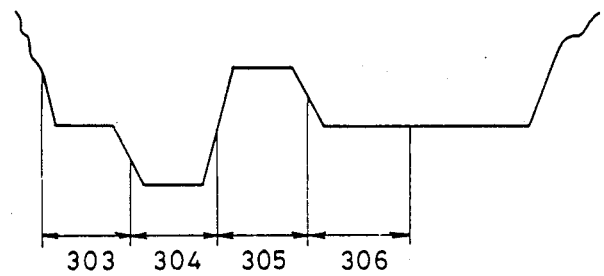
Figure 3D:
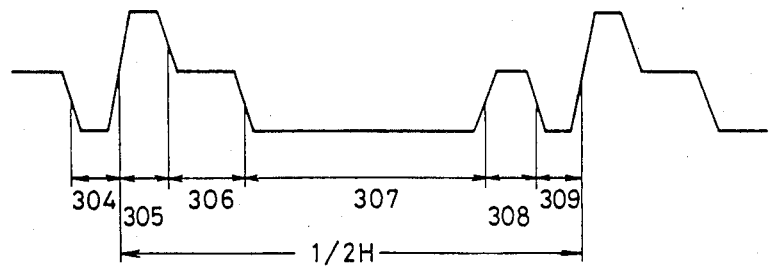

FIGS. 3A and 3B are waveforms showing a composite sync signal corresponding to a vertical blanking period of the first and second fields, respectively, and FIGS. 3C and 3D are waveforms showing in detail horizontal and vertical sync pulses corresponding to time intervals 301 and 302, respectively, shown by the broken-lines in FIG. 3A.

In the present invention, as shown in FIGS. 3A and 3C, one horizontal sync signal consists of a pair of negative and positive polarity pulses.

In FIG. 3C, an interval 303 is referred to as a front porch which is used to separate the picture signal from the sync signal. Intervals 304 and 305 indicate a negative polarity pulse and a positive polarity pulse, respectively, which constitute a horizontal sync pulse. An interval 306 is used as a clamping position or a sampling position of a reference level. The interval 306 also serves as a back porch for separating the sync signal from the picture signal.

In FIG. 3D, an interval 307 indicates a portion of a vertical sync pulse and an interval 308 serves to connect the trailing edge of the interval 307 to the front porch of the next sync signal. An interval 309 denotes a negative polarity pulse and corresponds to the interval 304.

The intervals 305-309 correspond to one half (½) of the horizontal scanning period.

Furthermore, the pulse widths 304 and 305 of the positive and negative polarity pulses are equal to each other and their pulse amplitudes are also equal to each other.

Figure 4:
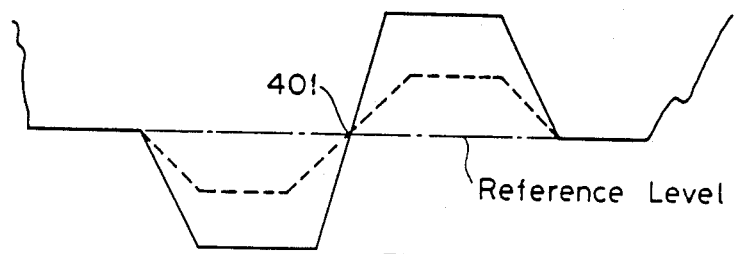
FIG. 4 is a waveform used to explain the operation of horizontal synchronization in accordance with the present invention.

Referring next to FIG. 4, the position of a reproduced phase in an embodiment of a horizontal sync pulse in accordance with the present invention will be described. In FIG. 4, the solid line indicates a normal waveform, while the broken-line indicates a distorted (linear distortion) waveform.

As is clear from FIG. 4, even when waveform distortion (linear distortion) occurs, the position 401 of the reproduced phase or the position at which the polarity of the horizontal sync pulse is reversed is maintained substantially at the same position.

It follows, therefore, that when the time point 401 at which the horizontal sync pulse crosses the reference level is detected as a reference of a reproduced horizontal sync phase, the reproduced phase is not affected by the distortion. In general, the pedestal level of a picture signal is used as the above-described reference level, so that the sync signal can be reproduced with a correct phase in the usual manner.

FIGS. 5A, 5B, 5C and 5D are waveforms used to explain the operation of vertical synchronization in accordance with the present invention.

Figure 5A:
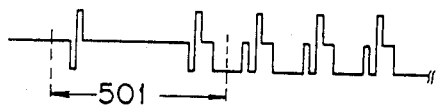
FIGS. 5A, 5B, 5C and 5D are waveforms used to explain the operation of vertical synchronization in accordance with the present invention.
Figure 5B:
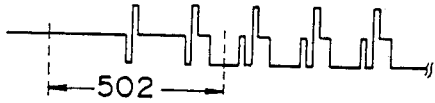
Figure 5C:
Figure 5D:
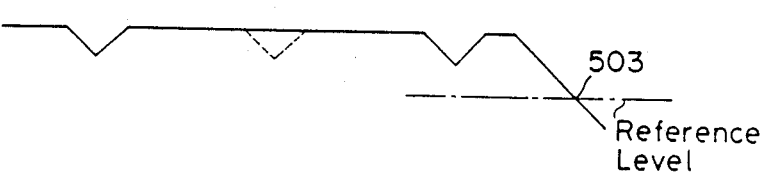

FIGS. 5A and 5B are waveforms showing the composite sync signal in the vertical blanking intervals in the first and second fields, respectively. FIG. 5C indicates, in an enlarged form, the waveform obtained by the superposition of intervals 501 and 502 shown in FIGS. 5A and 5B. The solid line indicates the signal in the first field, while the broken-line indicates the signal in the second field. FIG. 5D shows an integrated waveform obtained by integrating the signal shown in FIG. 5C.

In the present invention, the horizontal sync signal has a waveform which is point-symmetrical and which consists of a positive polarity pulse and a negative polarity pulse, so that the waveform obtained by the integration of the horizontal sync signal always becomes zero before and after the horizontal sync pulse.

That is, at a reference position at which the vertical sync pulse starts, the integrated output has the same waveform regardless of the first or second field. More specially, the waveforms of the vertical sync pulses in the vertical blanking intervals are the same in both fields, so that the integrated outputs of the vertical sync pulses have the same waveform. Therefore, when a position 503 at which the integrated waveform intersects the reference level is selected as the reference of a reproduced vertical sync phase, the vertical sync signals are reproduced with the same phase in both the first and second fields.

In the composite sync waveforms as shown in FIGS. 3A and 3B, the average pulse levels (APL) are not zero. Therefore, when the reference level varies, a slight variation in reproduced phase of the vertical sync signal occurs.

In order to improve this situation, in another example of waveforms as shown in FIGS. 6A and 6B, the same number of pulses whose polarity is opposite to that of the vertical sync pulses are added to the composite sync signal, so that the average pulse level can be brought completely to zero.

FIGS. 6A and 6B show the composite sync signal corresponding to a vertical blanking period of the first and second fields, respectively.

In this case, it is sufficient that the reference level is set to zero potential. Then, a variation in reference level does not influence the reproduced phase.

Furthermore, the pulse train consisting only of the negative pulses derived from the waveform is similar in waveform to the conventional composite sync signal. Therefore, in a system in which a slight error in the reproduced phase is allowed, like in a CRT monitor, the sync signal can be separated by a conventional amplitude separation circuit.

FIGS. 7A and 7B are waveforms showing a signal arrangement in a case where there are 1125 scanning lines and the 2:1 interlaced scanning is carried out, as an embodiment of a television synchronization system in accordance with the present invention.

FIGS. 7A and 7B indicate waveforms of the sync signals mainly in the vertical blanking intervals in the first and second fields, respectively.

In FIGS. 7A and 7B, the numerals indicate the number each horizontal scanning line and H expresses one horizontal scanning period. Here, the vertical blanking period is provided with 45H in total and consists of 5H in the first field or 5.5H in the second field before the vertical sync pulse portion, a 5H vertical sync pulse portion and 35H in the first field or 34.5H in the second field following the vertical sync pulse portion.

Figure 8:
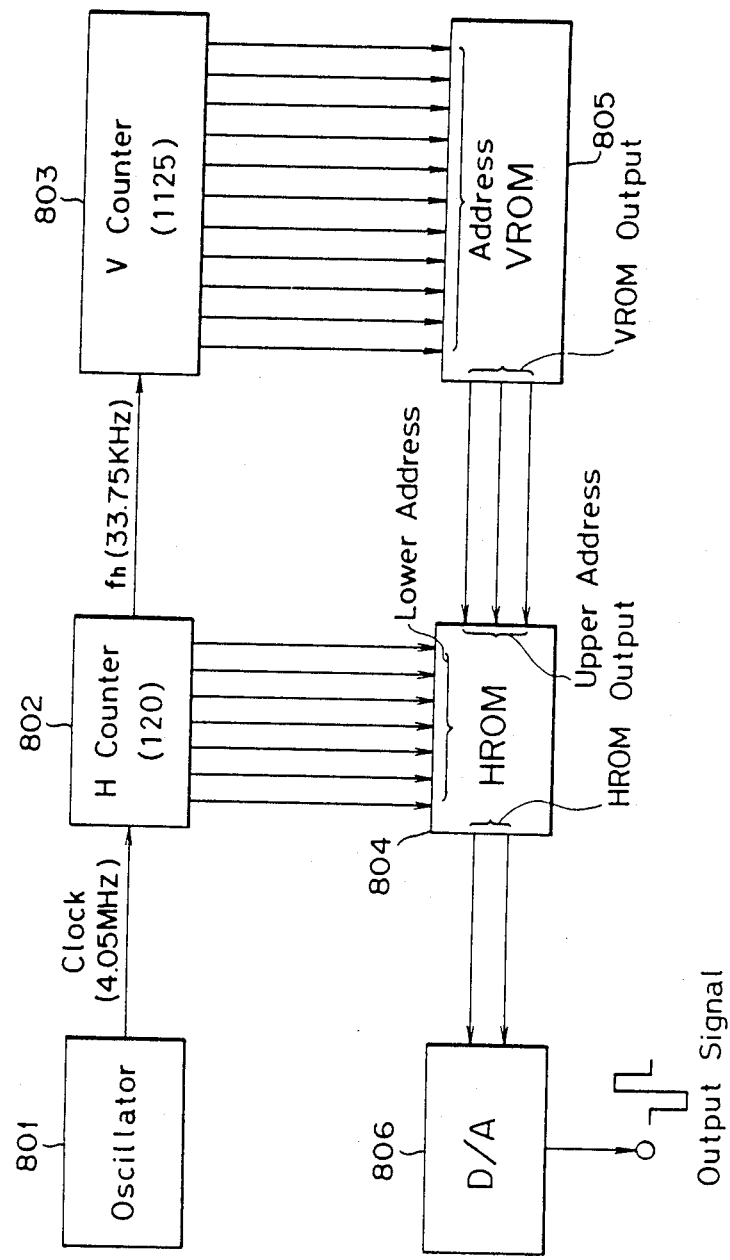
FIG. 8 is a block diagram showing an embodiment of an arrangement for generating a television sync signal in accordance with the present invention.

FIG. 8 is a block diagram showing an arrangement of one embodiment of the present invention for generating the television sync signals as shown in FIG. 7.

In FIG. 8, 801 denotes an oscillator for generating clock pulses. 802 is an H counter for generating one output every horizontal scanning period (1H). 803 is a V counter for counting one frame period.

804 is an HROM which, as will be described in detail hereinafter, stores different waveform information concerning the waveform information in one horizontal scanning period (1H) at a predetermined horizontal scanning position within one frame.

806 is a D/A converter which accomplishes digital-to-analog conversion of the output data derived from HROM 804 to generate the composite sync signal.

Next, the mode of operation of the embodiment shown in FIG. 8 will be described.

Figure 9:
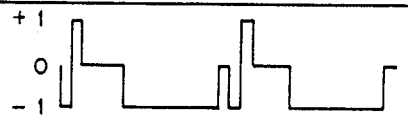
FIG. 9 is a waveform chart showing five examples (A)–(E) of waveforms of a sync signal in accordance with the present invention within one horizontal scanning period.
Figure 9:
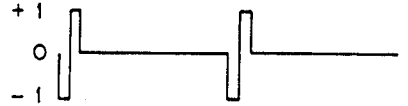
Figure 9:
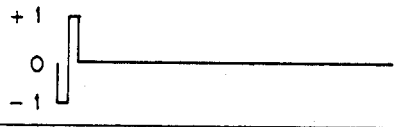
Figure 9:
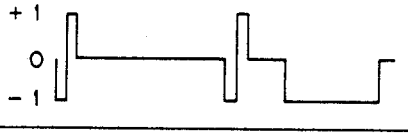
Figure 9:
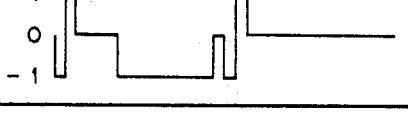

805 denotes a VROM which, as will be described in more detail with reference to FIG. 9, stores the information for switching the waveforms within one horizontal scanning period (1H) in response to the horizontal scanning line number in one frame which is counted by the V counter 803, so that in response to the stored information, the waveform information in the HROM 804 is switched in accordance with the horizontal scanning position as shown in FIG. 9.

In this embodiment, a sync signal generator for generating the composite sync signal used in the 2:1 interlaced scanning system in case of 1125 horizontal scanning lines, as mentioned above, will be described in detail.

The oscillator 801 generates the clock signal at 4.05 MHz. The H counter 802 counts the clock signal during one horizontal scanning period (1H).

The horizontal scanning frequency fh is 33.75 KHz, so that the number of clock pulses during one horizontal scanning period (1H) becomes 120 obtained by dividing 4.05 MHz by 33.75 KHz.

The H counter 802 carries out frequency division in such a manner that one pulse is generated for every 120 clock pulses and accordingly the output pulse is generated for every one horizontal scanning period (1H).

The V counter 803 counts the output pulses from the H counter 802 and accomplishes frequency division in such a way that one output pulse is generated for every one frame period.

When the H counter 802 counts one horizontal scanning period (1H), it is reset to its initial state. When the V counter 803 counts one frame period, it is reset to its initial state.

The HROM 804 receives both the output pulses from the H counter 802 and the output digital data from the VROM 805, then outputs digital data corresponding to the waveform in a predetermined 1H period with respect to the scanning line position determined by the V counter 803.

The output data from the HROM 804 consists of two-bit data having an upper bit and a lower bit, so that the three levels "−1", "0" and "+1" of the positive and negative polarity pluses can be expressed by the following correspondence, for instance:

| Pulse values | HROM output | |
|---|---|---|
| | upper bit | lower bit |
| +1 | 1 | 0 |
| 0 | 0 | 1 |
| −1 | 1 | 1 |

The HROM output consisting of one of the above-described combinations of two bits is supplied to the D/A converter 806 and is converted into the analog signal, so that a sync signal having a waveform in the form of an analog signal formed by three levels "−1", "0" and "1" is generated.

Here, the VROM 805 is used to reduce the storage capacity of the HROM 804. That is, when the same signal waveform is used for every horizontal scanning period (1H) in all of one frame, it is sufficient that one type of the signal waveform is stored in the HROM 804, so that the arrangement of the HROM 804 can be made simple. However, in practice, in order to generate the vertical sync signal for 2:1 interlaced scanning system, the waveforms in respective 1H periods at predetermined scanning lines in each field are different.

Therefore, the V counter 803 counts the number of the horizontal scanning lines in one frame so as to discriminate the waveforms of the sync signal in 1H. That is, the information for switching the waveforms in 1H in response to the horizontal scanning line number is stored in the VROM 805.

In this embodiment, for instance, in response to the horizontal scanning line numbers, five types of sync signal waveforms are prepared as indicated by (A)-(E) in FIG. 9.

In order to select one of the five types of waveforms in accordance with a horizontal scanning line number, a three-bit output derived from the VROM 805 is utilized.

Figure 10:
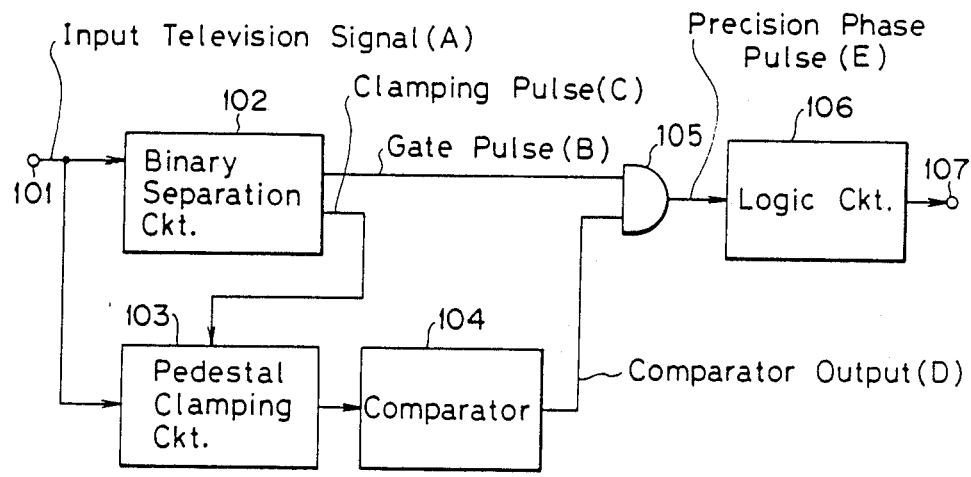
FIG. 10 is a block diagram showing an embodiment of a circuit arrangement for separating a sync signal formed in accordance with the present invention.

The two-bit output derived from the HROM 804 may have various formats in addition to that described above with reference to FIG. 9, depending upon characteristics of the D/A converter used for D/A conversion of the two-bit data An explanation will be made of a circuit arrangement for performing sync separation when the television composite sync signal is received through the transmission line in the above-described embodiment FIG. 10 is a block diagram showing one embodiment of a circuit for separating the sync signal generated in accordance with the present invention.

In FIG. 10, reference numeral 101 denotes an input terminal for receiving a television signal (A), the pedestal level of which is used as a reference level Reference numeral 102 denotes a binary separation circuit which generates binary pulses from the negative pulses of the composite sync signal.

Reference numeral 103 denotes a pedestal clamping circuit for clamping the pedestal of the television signal derived from the input terminal 101 in response to the reference level (pedestal) extracted by the clamping pulse (C) which in turn is derived from the binary separation circuit 102. 104 denotes a comparator for comparing the television signal whose pedestal is clamped by the clamping circuit 103 with the reference level to obtain a comparator output (D). Reference numeral 105 denotes a gate circuit for extracting the comparator output (D) during the gate pulse (B) to obtain a timing pulse (E). Reference numeral 106 is a logic circuit for generating the horizontal and vertical sync signals based on the precision phase pulses delivered from the gate circuit 105. Reference numeral 107 is an output terminal.

Referring next to FIGS. 11A-11E, the mode of operation of the sync separation circuit shown in FIG. 10 will be described.

Figure 11:
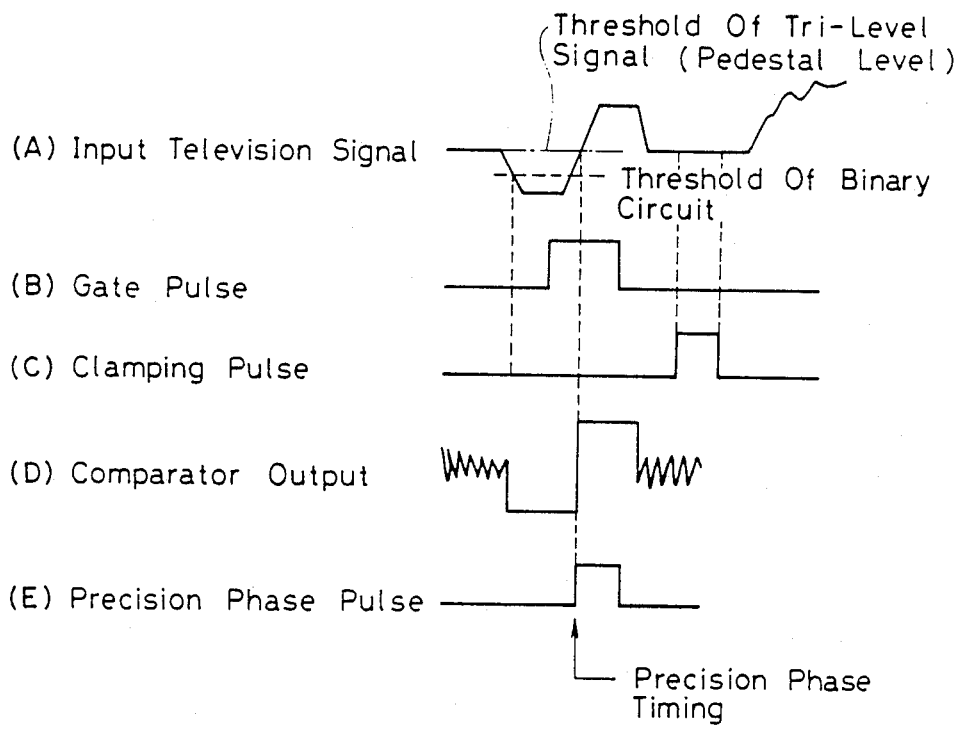
FIGS. 11A–11E are waveforms showing operations of various portions in the synchronization separation circuit arrangement shown in FIG. 10.

The input terminal 101 receives the television signal (A) which includes the tri-level bipolar sync signal. The binary separation circuit 102 detects only the negative polarity pulses based on the threshold level for the binary circuit, thereby extracting the negative polarity pulse of the horizontal sync signal as shown in FIG. 11A. Then, as shown in FIGS. 11B and 11C, the gate pulse (B) and the clamping pulse (C) are generated.

The binary separation circuit 102 per se can be easily constructed from the circuits used in the conventional television system. Furthermore, the purpose of the binary separation can be satisfied by the degree of precision which can be obtained by such a construction of the binary separation circuit 102.

The clamping pulse (C) derived from the binary separation circuit 102 is applied to the pedestal clamping circuit 103. The pedestal of the television signal (A) derived from the input terminal 101 is clamped to the reference level and furthermore the output from the pedestal clamping circuit 103 is shaped into a binary logic signal by the comparator 104.

In the comparator 104, the pedestal level is used as a comparison reference level and the horizontal sync signal in the television signal whose pedestal is clamped is compared with the pedestal level. The waveform of the output signal (D) from the comparator 104 is shown in FIG. 11D.

In response to the output signal (D) from the comparator 104 and the gate pulse (B) from the binary separation circuit 102, the gate circuit 105 extracts a pulse output (E) at the time that the tri-level bipolar sync signal crosses the pedestal level.

The pulse output (E) at this timing will be referred to as a precision phase pulse hereinafter in this specification. FIG. 11E shows the waveform of this pulse and its timing position. The timing position can be set as a reference point which is hardly adversely affected by the characteristics of a transmission line.

In response to the precision phase pulse, the logic circuit 106 can generate desired horizontal and vertical sync signals.

The logic circuit 106 per se can be easily constructed by combining binary logic circuits practically used for reproducing the conventional television sync signal.

Figure 12:
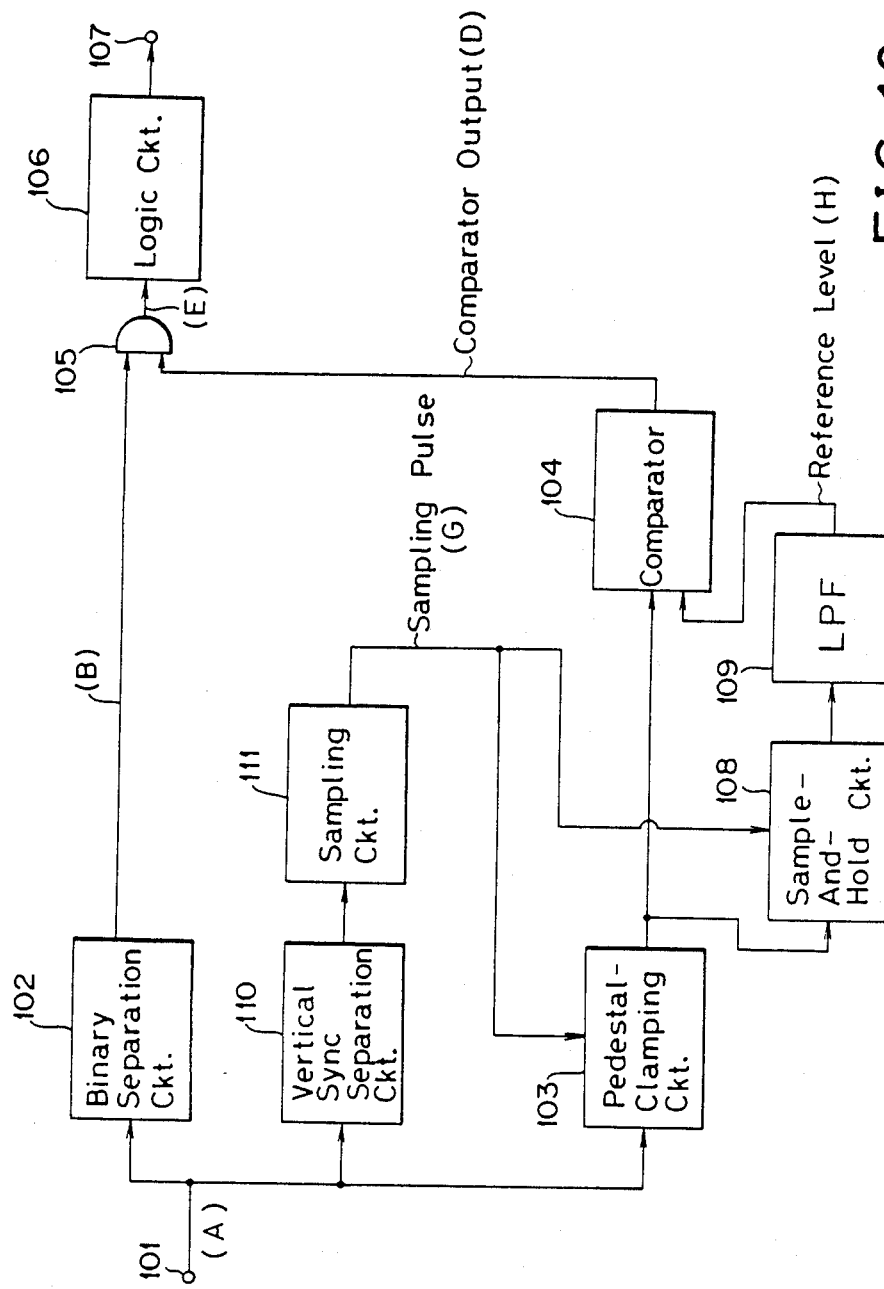
FIG. 12 is a block diagram showing another embodiment of a circuit arrangement for separating a sync signal formed in accordance with the present invention.

FIG. 12 is a block diagram showing another embodiment of a circuit arrangement for separating the sync signal formed in accordance with the present invention.

In FIG. 12, the same reference numerals as those in FIG. 10 are used to designate the corresponding portions and no further description shall be made for the corresponding portions. In FIG. 12, reference numeral 108 denotes a sample-and-hold circuit; 109, a low pass filter (LPF); 110, a vertical sync separation circuit; and 111, a sampling circuit.

FIGS. 13A and 13B show waveforms used to explain the mode of operation of the embodiment shown in FIG. 12.

As described above with reference to FIG. 10, the performance of the sync separation circuit is clearly dependent on the degree of precision of the pedestal clamping. Therefore, it is preferable that a feedback clamping circuit is used to clamp the pedestal.

When the characteristics of the transmission line are deteriorated, there occurs an inconvenience that an original sync signal I is distorted into the waveform of a distorted sync signal II, as shown in FIG. 13A.

In this case, even if the pedestal is clamped by the clamping pulse (C) in the clamping circuit 103, it is impossible to correctly reproduce the pedestal level, because of the waveform distortion. As a result, as shown in FIG. 13A, the timing III at which the leading edge of the tri-level bipolar sync signal crosses the threshold level is detected, so that an incorrect phase pulse is produced.

In order to avoid such an inconvenience, in the circuitry shown in FIG. 12, the vertical sync separation circuit 110 and the sampling circuit 111 extract 1H in the vertical blanking period and furthermore, as shown in FIG. 13B, a sampling pulse (G) is generated at a timing in a portion which is not adversely affected by the waveform distortion of the sync pulse within the period.

In the pedestal clamping circuit 103, the pedestal of the television signal (A) received at the input terminal 101 is clamped to the reference level.

In the sample-and-hold circuit 108, a portion in the vertical blanking period of the television signal which is clamped in the clamping circuit 103 is sampled by the sampling pulse (G) and the pedestal level thus sampled is held.

The output of the pedestal level thus sampled and held is applied to the low-pass filter 109 to obtain a reference level signal (H) which in turn is applied to the comparator 104. In the comparator 104, as in the embodiment described above with reference to FIG. 10, the clamped television signal derived from the clamping circuit 103 is compared with the reference level signal (H) so that the comparator output (D) is obtained as shown in FIG. 11D. Of the comparator output (D), a portion corresponding to the timing of the gate pulse (B) is extracted to obtain the precision phase pulse (E).

In general, when an influence of waveform distortion of the sync signal continues for about 1H, the picture signal itself is distorted, so that it is considered that the value of the distortion exceeds a tolerable amount.

It follows, therefore, that the need for correctly separating the sync signal is limited to the case in which the influences of the waveform distortion of the sync signal disappear within a short period of time. In the case of a transmission line through which a waveform is distorted for such a short period of time, the pedestal level can be correctly detected by utilizing the sample-and-hold circuit 108 in the embodiment shown in FIG. 12.

Therefore, the comparator 104 can extract the above-described precision phase timing by using the detected pedestal level as a reference level.

POSSIBLE APPLICATIONS IN THE INDUSTRY

As described above, according to the present invention, the accuracy of a reproduced phase of a television synchronization signal reproduced from a transmitted television signal is improved and influences due to linear distortion of the waveform of the sync signal caused in the transmission line or the like are eliminated.

Furthermore, even if an integration separation circuit is used to separate the vertical sync signal, there exists no difference in phase of the vertical sync signal between the first and second fields Furthermore, when a slight error in the reproduced phase is permitted, for example, in the case of a CRT monitor, a conventional sync separation circuit can be utilized In this case, an error in the reproduced phase of the vertical sync signal is the same as that produced in a prior art television synchronization system.

Moreover, in the television sync signal in accordance with the present invention the reproduced phase is correct, so that the television sync signal is advantageously used as a synchronization signal for a transmission system (TCI system) in which television signals are compressed in the direction of the time axis and then multiplexed.

Furthermore, when component signals are separately transmitted in parallel with each other, the television synchronization signal in accordance with the present invention can be used as a phase control signal for adjusting the transmission delay time in each transmission line.

We claim:

1. Apparatus for generating an analog television synchronization signal comprising at least one frame period having first and second fields, said frame period including a plurality of sequential horizontal sync signals each of which occurs within a corresponding numbered horizontal scanning period and has a predetermined three-level analog waveform with a reference level, the waveforms of said horizontal sync signals including pairs of contiguous successive negative and positive polarity pulses the integrals of which are substantially the same for each of said first and second fields, a phase reference time being defined by the transition through said reference level from one polarity level to the other of the contiguous successive negative and positive polarity pulses included within a predetermined one of said horizontal sync signals, comprising horizontal signal generating means for generating a horizontal sync signal having a period equal to that of said numbered horizontal scanning periods;

counting means for counting from said phase reference time the number of each of said horizontal scanning periods, said counting means generating for each numbered horizontal scanning period a signal corresponding to the number thereof;

storage means coupled to said horizontal signal generating means and said counting means for storing said predetermined three-level analog waveforms, said storage means outputting digital data corresponding to said predetermined stored waveforms in accordance with the output of said counting means; and digital-to-analog converter means for converting said digital data to said analog television synchronization signal, said phase reference time remaining substantially constant during transmission of said television synchronization signal over a transmission path despite variations in the characteristics thereof.

2. Apparatus for generating an analog television synchronization system as claimed in claim 1 wherein said horizontal signal generating means comprises a clock signal generator for generating clock signal pulses and a first counter coupled to the output of said clock signal generator, said first counter counting said clock signal pulses and generating at an output thereof a first counter corresponding to said horizontal sync signal; and wherein said counting means comprises a second counter coupled to the output of said first counter and a memory coupled to the output of said second counter, said second counter counting said first count and generating at the output thereof a second count corresponding to said number of each horizontal scanning period, said memory storing said number therein and outputting it to said storage means.

3. Apparatus for generating an analog television synchronization signal as claimed in claim 1 wherein each pulse of said pairs of contiguous successive negative and positive polarity pulses comprising the three-level analog waveforms stored in said storage means has the same amplitude.

4. Apparatus for generating an analog television synchronization signal as claimed in claim 1 wherein the pulses included in each pair of contiguous successive negative and positive polarity pulses comprising the three-level analog wave forms stored in said storage means are symmetrical with respect to said phase reference time.

5. Apparatus for generating an analog television synchronization signal as claimed in claim 4 wherein each pulse of said pairs of contiguous successive negative and positive polarity pulses comprising the three-level analog waveforms stored in said storage means has the same amplitude and duration.

6. Apparatus for generating an analog television synchronization signal as claimed in claim 5 wherein the amplitude of each of said pulses is $300 \pm 6$ mV and the duration of each of said pulses is $0.59 \pm 0.03$ $\mu$sec.

7. Apparatus for generating an analog television synchronization signal as claimed in claim 1 wherein predetermined pairs of the contiguous successive negative and positive polarity pulses comprising the three-level analog waveform stored in said storage means are followed by a further negative polarity pulse having a longer duration than the negative polarity pulse of said contiguous pulses.

8. Apparatus for generating an analog television synchronization signal as claimed in claim 7 wherein the duration of each of said further negative pulses is $11.86 \pm 0.05$ $\mu$sec.

9. Apparatus for receiving a television signal comprising at least one frame period having first and second fields, said frame period including a plurality of sequential horizontal sync signals each of which occurs within a corresponding numbered horizontal scanning period and has a predetermined three-level analog waveform with a reference level, the waveforms of said horizontal sync signals including pairs of contiguous successive negative and positive polarity pulses the integrals of which are substantially the same for each of said first and second fields, a phase reference time being defined by the transition through said reference level from one polarity level to the other of the contiguous successive negative and positive polarity pulses included within a predetermined one of said horizontal sync signals, comprising means for receiving said television signal;

binary separation means coupled to said television signal receiving means, said binary separation means detecting the negative polarity pulse in said television signal and generating gate and clamping pulses;

clamping means coupled to said television signal receiving means and said binary separation means for clamping said television signal at said reference level;

comparator means coupled to said clamping means for comparing said reference level with said clamped television signal, the output of said comparator means having a transition from one polarity level to the other at said phase reference time;

gate means for receiving said gate pulse and the output of said comparator means, said gate means generating a precision phase pulse at said phase reference time; and logic circuit means coupled to said gate means for reproducing said television synchronization signal in synchronism with said phase reference time.

10. Apparatus for receiving a television signal comprising at least one frame period having first and second fields, said frame period including a plurality of sequential horizontal sync signals each of which occurs within a corresponding numbered horizontal scanning period and has a predetermined three-level analog waveform with a reference level, the waveforms of said horizontal sync signals including pairs of contiguous successive negative and positive polarity pulses the integrals of which are substantially the same for each of said first and second fields, a phase reference time being defined by the transition through said reference level from one polarity level to the other of the contiguous successive negative and positive polarity pulses included within a predetermined one of said horizontal sync signals, comprising means for receiving said television signal;

binary separation means coupled to said television signal receiving means, said binary separation means detecting the negative polarity pulse in said television signal and generating a gate pulse;

vertical sync separation and sampling circuits coupled to said television signal receiving means, said vertical sync and sampling circuits extracting one horizontal scanning period from said television signal and generating a sampling pulse;

clamping means coupled to said television signal receiving means and said sampling means for clamping said television signal at said reference level;

comparator means coupled to said clamping means for comparing said reference level with said clamped television signal, the output of said comparator means having a transition from one polarity level to the other at said phase reference time;

gate means for receiving said gate pulse and the output of said comparator means, said gate means generating a precision phase pulse at said phase reference time; and logic circuit means coupled to said gate means for reproducing said television synchronization signal in synchronism with said phase reference time.

11. Apparatus for receiving a television signal as claimed in claim 10 which further comprises a sample-and-hold circuit interposed between the output of said clamping means and an input of said comparator means, said sample-and-hold circuit holding the television signal clamped by said clamping means.

12. Apparatus for receiving a television signal as claimed in claim 11 which further comprises a low pass filter interposed between said sample-and-hold circuit and said input of the comparator means.

13. A television synchronization system for generating and receiving an analog television synchronization signal comprising at least one frame period having first and second fields, said frame period including a plurality of sequential horizontal sync signals each of which occurs within a corresponding numbered horizontal scanning period and has a predetermined three-level analog waveform with a reference level, the waveforms of said horizontal sync signals including pairs of contiguous successive negative and positive polarity pulses the integrals of which are substantially the same for each of said first and second fields, a phase reference time being defined by the transition through said reference level from one polarity level to the other of the contiguous successive negative and positive polarity pulses included within a predetermined one of said horizontal sync signals, comprising apparatus for generating said television synchronization signal, including horizontal signal generating means for generating a horizontal sync signal having a period equal to that of said numbered horizontal scanning periods;

counting means for counting from said phase reference time the number of each of said horizontal scanning periods, said counting means generating for each numbered horizontal scanning period a signal corresponding to the number thereof;

storage means coupled to said horizontal signal generating means and said counting means for storing said predetermined three-level analog waveforms, said storage means outputting digital data corresponding to said predetermined stored waveforms in accordance with the output of said counting means; and digital-to-analog converted means for converting said digital data to said analog television synchronization signal, said phase reference time remaining substantially constant during transmission of said television synchronization signal over a transmission path despite variations in the characteristic thereof; and apparatus for receiving said television signal, including means for receiving said television signal;

binary separation means coupled to said television signal receiving means, said binary separation means detecting the negative polarity pulse in said television signal and generating gate and clamping pulses;

clamping means coupled to said television signal receiving means and said binary separation means for clamping said television signal at said reference level;

comparator means coupled to said clamping means for comparing said reference level with said clamping television signal, the output of said comparator means having a transition from one polarity level to the other at said phase reference time;

gate means for receiving said gate pulse and the output of said comparator means, said gate means generating a precision phase pulse at said phase reference time; and logic circuit means coupled to said gate means for reproducing said television synchronization signal in synchronism with said phase reference time.

14. A method of generating an analog television synchronization signal comprising at least one frame period having first and second fields, said frame period including a plurality of sequential horizontal sync signals each of which occurs within a corresponding numbered horizontal scanning period and has a predetermined three-level analog waveform with a reference level, the waveforms of said horizontal sync signals including pairs of contiguous successive negative and positive polarity pulses the integrals of which are substantially the same for each of said first and second fields, a phase reference time being defined by the transition through said reference level from one polarity level to the other of the contiguous successive negative and positive polarity pulses included within a predetermined one of said horizontal sync signals, comprising the steps of generating a horizontal sync signal having a period equal to that of said numbered horizontal scanning periods;

counting from said phase reference time the number of each of said horizontal scanning periods and generating for each number horizontal scanning period a signal corresponding to the number thereof;

storing said predetermined three-level analog waveforms and outputting digital data corresponding to said predetermined stored waveforms in accordance with the output of said counting means; and converting said digital data to said analog television synchronization signal, said phase reference time remaining substantially constant during transmission of said television synchronization signal over a transmission path despite variations in the characteristic thereof.

* * * * *

UNITED STATES PATENT AND TRADEMARK OFFICE
CERTIFICATE OF CORRECTION

PATENT NO. : 4,864,400

DATED : September 5, 1989

INVENTOR(S) : Junji KUMADA ET AL.

It is certified that error appears in the above-identified patent and that said Letters Patent is hereby corrected as shown below:

Title Page:
    Please correct line [73] to

-- [73] Assignee: Nippon Hoso Kyokai, Tokyo, Japan --

Signed and Sealed this

Tenth Day of July, 1990

Attest:

HARRY F. MANBECK, JR.

Attesting Officer      Commissioner of Patents and Trademarks